Jan. 12, 1971  A. E. USHAKOFF  3,554,704
BIOLOGICAL ASSAY CELL
Filed Feb. 10, 1969
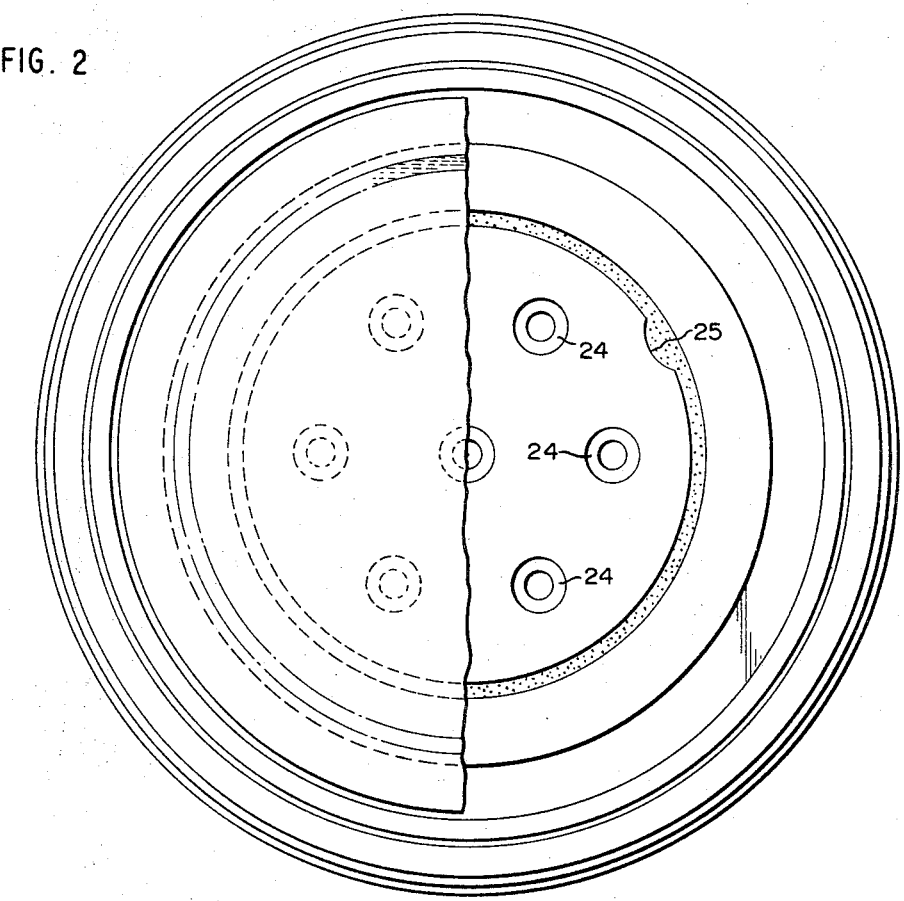
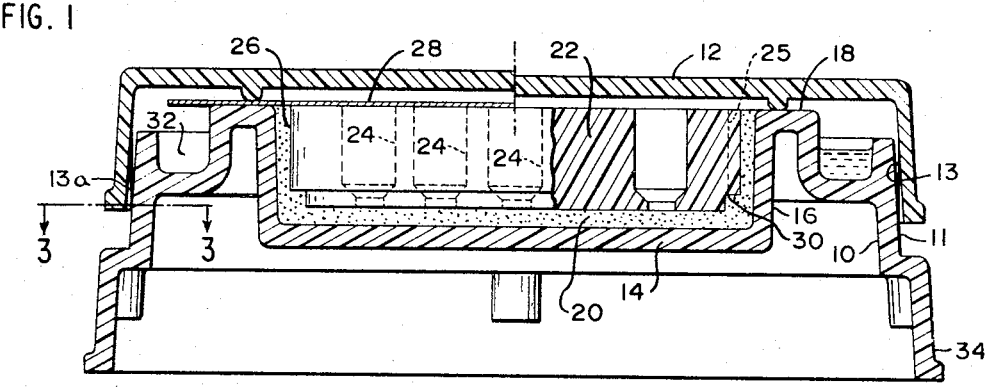
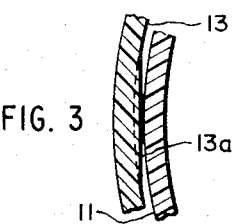
INVENTOR.
ALEXIS E. USHAKOFF
BY
Kenway, Jenney & Hildreth
ATTORNEYS

United States Patent Office 3,554,704
Patented Jan. 12, 1971

3,554,704
BIOLOGICAL ASSAY CELL
Alexis E. Ushakoff, Miami, Fla., assignor to Cordis Corporation, Miami, Fla., a corporation of Florida
Filed Feb. 10, 1969, Ser. No. 797,954
Int. Cl. C12k 1/10; G01n 33/16
U.S. Cl. 23—253
2 Claims

ABSTRACT OF THE DISCLOSURE

A ready to use two directional immunodiffusion (ouchterlony) cell consists of a transparent plastic container in which is housed a preformed gel layer and an adjacent surface contacting template formed with wells to receive liquid reactants. The volume occupied by the gel layer is sealed by a membrane from most of the remaining air space within the cell, and a trough for water to maintain a saturated atmosphere is formed within such remaining air space.

This invention relates to biochemical analysis, and resides in a disposable device for carrying out two directional immunodiffusion techniques by the ouchterlony method.

In ouchterlony techniques, two precipitate-forming reactants in solution are allowed to diffuse together in a gel layer. Where they meet in sufficient concentration, precipitate bands form, yielding information regarding the composition of the samples. The method can also be used as a quantitative system, by comparison of various dilutions of both known and unknown samples of one reactant, each of which is caused to diffuse against a sample of the other reactant. For this latter purpose, mono-specific antibodies are required.

The present invention is aimed at providing a ready to use disposable ouchterlony cell.

Such a cell must be capable of presenting an aqueous sterile gel layer, and provide reservoirs or wells for retaining the reactant samples in contact with the surface of the gel at spaced apart locations. In addition, the cell must be fashioned so that water in the gel will not evaporate away.

The ouchterlony cell of this invention includes a housing having a central flat area which supports a preformed agar gel sheet or film adjacent to which is a template formed with wells which communicate with the surface of the agar gel film. The immunodiffusion reactants will be contained in these wells so that proper diffusion through the gel film will occur.

Because visual effects are to be observed in using the cell, it will be made of a transparent plastic, which is permeable to water vapor to an appreciable extent. According to this invention, the escape of water from the cell and from the gel is prevented by appropriately sealing off the gel film with a water impermeable barrier, and by providing a constantly saturated atmosphere maintained by an internal supply of water within the cell.

In addition the agar gel film is maintained under conditions that have been found to eliminate disruptive effects caused by loss of moisture, as will occur for instance through temperature fluctuations. The development work leading up to the subject of this application demonstrated that when an agar gel is packaged in a container, with free void or air space, even though it be hermatically sealed and provided with a constantly moisture-saturated atmosphere, water would evaporate from the agar gel and condense on droplets on the cool walls of the container. If these droplets should settle again on the gel, some of the moisture is reabsorbed, but the net effect is that the gel shrinks and moisture is lost, all this being disruptive of both the composition and geometry of the gel.

It has now been discovered that if the gel is packaged in a manner that leaves no substantial free air space, the substantial loss of moisture does not occur and the gel is largely stabilized against compositional and/or dimensional changes. It is accordingly a feature of the ouchterlony cells of this invention that the gel film extends throughout substantially all of the free volume within the container not occupied by the template and that the interior of the container be sealed up so that there is substantially no unnecessary free space adjacent to the agar gel. In one aspect this is accomplished by providing a film or foil seal over the interior of the cell, with all of the volume therein except for the wells within the template filled with agar.

A further feature of the invention is the provision of a separate trough within the container designed to contain water by which a constantly saturated atmosphere is assured within the cell.

The cell of this invention accordingly comprises a flat base of transparent plastic and a tight fitting cover of transparent plastic. Within the covered area, is a circular depression for holding a reservoir of water when the unit is being used. The central area of the base accommodates a gel layer, over which lies the template formed with well openings which serve as reservoirs for the reactant samples.

A preferred embodiment of the micro ouchterlony cell of this invention is described in detail below and illustrated in the accompanying drawings in which:

FIG. 1 is an elevation in cross section of the ouchterlony cell of this invention with parts broken away to reveal structural details;

FIG. 2 is a plan view of FIG. 1; and

FIG. 3 is a sectional view taken at 3—3 in FIG 2.

As will be seen from the drawings the cell is formed within a base member 10 which is a dish of generally circular plan having an outer upper wall 11 formed as an inwardly tapering conical section that may be fitted to a cover 12 having a peripheral lower wall 13 which engages the upper outer wall of the base. Both the base 10 and cover 12 are molded of a transparent plastic such a polystyrene, and provide an enclosure for the cell. The inside wall 13 of the cover may be formed with three or four stand off wedge shaped bosses, as indicated at 13a, which facilitates its removal from the base.

The central portion of the interior of the base 10 is in the form of a circular pan having a flat bottom 14 and surrounding side portions 16 that extend upwardly and terminate in an annular lip 18. A film of an agar gel 20 is supported at the bottom 14 and in turn supports the template 22 in which are formed wells 24. Preferably the template 22 is in the form of a deep circular disc having a flat bottom and circular side walls 26 spaced inwardly from the sides 16 of the pan, and the entire volume between the pan and template both at the bottom and edges is filled with agar gel. The top of the template 22 is substantially coplanar with the lip 18 of the pan such that a sealing membrane 28 may be placed flat over the rim of the pan substantially in contact with the top of the template 22, effectively to seal the volume occupied by the gel. An indentation 25 in the side of the template 22 serves to key the template and gel together so that the former will not rotate within the gel.

The wells within the template are arranged in accordance with known ouchterlony methods, in the illustrated embodiment there is a central well surrounded by six equally spaced peripheral wells in a hexagonal pattern.

In the preferred illustrated embodiment the template 22 is under cut around its lower edges to form an edge groove 30 of right angle cross section, which serves to provide an additional quantity of agar between the pan and template, and also serves to identify which side of the template is the bottom for automatic positioning prior to the agar filling operation. In this connection it should be noted that the wells 24 are smaller at the bottom surface of the template where contact is made with the gel, the upper portions serving as relatively large reservoirs for the reactants.

The interior of the base surrounding the pan includes an annular trough 32, designed to serve as a reservoir for water to maintain a constantly saturated atmosphere within the cell.

The lower portion 34 of the base is also formed of conical section, generally extending that of the cover, and is hollow to provide an internal lower recess adapted to mate with the cover of another cell to permit stacking in the manner of Cape Ann dories.

In FIG. 1 of the drawings it will be noted that the left hand side illustrates the cell with the cover on with the foil present as the cell would be assembled for shipment and sale. On the right hand side the foil has been removed and water has been placed within the annular trough as the cell would be in actual use preparatory to receiving the reactants within the wells.

In FIG. 2 the cell is shown with the cover removed, the left hand view showing the foil and the right hand side showing the foil removed.

In assembling the cells a proper quantity of agar solution in water is placed within the pan and the template set therein and held in place until the agar gel sets. Excess gel may then be removed mechanically from the wells, or they may be temporarily plugged to prevent the entry of the gel solution, and a foil of aluminum and Mylar (polyethylene terephthalate) laminated together is placed over the pan and template and cemented to the rim. The cover is set over the base, preferably after its inner edge has been coated with a silicon grease such as stopcock grease to insure a tight seal.

The seal thus assembled may be stored for several months preferably under refrigeration, ready for use. At this time it is only necessary to remove the cover, strip away the foil and place the reactants within the wells. Each reactant solution rests directly on the underlying gel, diffusion begins immediately as in prior ouchterlony methods. Water may be placed within the trough 32, the cover replaced, and the cell may then be set aside for diffusion to occur.

Although this invention has been described with specific reference to the preferred embodiment, it is contemplated that modifications will readily occur to those skilled in the art and familiar with the principles herein set forth and that such can be made without departing from the scope of this invention.

Having thus disclosed my invention and described in detail the preferred embodiment thereof I claim and desire to secure by Letters Patent:

1. A disposable micro ouchterlony cell comprising a base member of transparent plastic formed with a flat central portion, a gel layer supported by said portion, a template of transparent plastic overlying said gel and having a plurality of reservoirs having openings perpendicular to and extending through the template, a water impenetrable membrane sealing off the space occupied by the gel and engageable with the template, and a removable cover over said base member.

2. The cell defined by claim 1 including also a trough within said base member and cover adapted to receive and contain a quantity of water sufficient to maintain a moisture saturated atmosphere with the cell.

References Cited
UNITED STATES PATENTS 2,533,089 12/1950 Brewer et al. _____ 195—139LE
3,165,450 1/1965 Scheidt _____ 195—139LE JOSEPH SCOURONEK, Primary Examiner R. M. REESE, Assistant Examiner U.S. Cl. X.R.

23—230, 292